ELECTRONIC SPECTROPHOTOMETER

Filed Feb. 14, 1966 6 Sheets-Sheet 1

Feb. 9, 1971 Z. GRABOWSKI ET AL 3,561,872

ELECTRONIC SPECTROPHOTOMETER

Filed Feb. 14, 1966 6 Sheets-Sheet 3

United States Patent Office 3,561,872
Patented Feb. 9, 1971

3,561,872
ELECTRONIC SPECTROPHOTOMETER

Zbigniew Ryszard Grabowski and Jozef Koszewski, Warsaw, Poland, assignors to Polska Akademia Nauk, Warsaw, Poland Filed Feb. 14, 1966, Ser. No. 527,251
Claims priority, application Poland, Feb. 22, 1965, P 107,569
Int. Cl. G01j *3/42*
U.S. Cl. 356—83 7 Claims

ABSTRACT OF THE DISCLOSURE

An electronic spectrophotometer comprises a movable light source in front of a luminous spot on a phosphor screen of a cathode-ray tube and a beam splitter which splits a radiation beam at an exit of a monochromator into a test beam and a reference beam, a photoelectric detector of the test beam being coupled through a negative feedback circuit to the electric gun of the cathode ray tube so that the output of the detector is at a constant level independent of the wavelength of the radiation impinging on the detector so that a second detector in the path of the test beam which passes through a sample has an output directly proportional to the transmittance of the sample.

This invention relates to an electronic spectrophotometer in which the scanning of the optical spectrum is performed by the movement of a light source in the form of a luminous spot.

Recently, spectral analysis methods using fast-operating spectrophotometers have found wider and wider use. The main feature of this method of investigation consists in illuminating of a test sample with the radiation of scanned wavelength and in measuring of the absorbance or transmittance as a function of the wavelength, and deducing both the qualitative composition of the sample from the wavelength of absorption maxima, and the quantitative composition from the magnitude of said absorbance or transmittance.

Hitherto known spectrophotometers, i.e. devices used for the analysis of the absorption spectrum may be divided into two basic groups.

In spectrophotometers belonging to the first group, a white light beam is transmitted through the sample and then after its spectral resolution change by means of a dispersion element, e.g. a prism or a diffraction grating, the radiation intensity is measured as a function of the wavelength.

In spectrophotometers belonging to the second group a white light is spectrally resolved in a monochromator which selects a nearly monochromatic beam of radiation, of adjustable wavelength, which is to be transmitted through the test sample.

Hitherto known monochromators are equipped usually with a movable element of the optical system, e.g. with a rotationally mounted prism resolving the incident white light beam, and simultaneously displacing, accordingly to its own rotation, the spectrum in relation to the exit slit, or it is equipped with continuously changing filters transmitting the radiation of time-dependent wavelength.

There are also known designs in which a traveling light source, e.g. a light beam passing through a movable slit, which light falls onto a stationary prism at varying angles of incidence, and causes the spectrum to be shifted in relation to the exit slit. The main disadvantage of known monochromator devices is the small velocity of the shifting of the spectrum relatively to the exit slit, and the rate of scanning of the optical spectrum is limited by the velocity and inertia of the movable element of the optical system.

In order to remove that disadvantage and increase the speed of scanning high frequency oscillating optical elements are employed, and also there are used dispersion elements having periodically variable resolving properties, e.g. liquid diffraction gratings formed in solutions under the influence of ultrasonic waves. The practical use of this principle, however, brings about serious technical difficulties caused by changes of the grating constant owing to the interference of standing waves.

The above mentioned disadvantages and inconveniences are removed in the electronic spectrophotometer according to the invention, which includes a monochromator equipped with a light source displaceable in relation to a fixed dispersion element in its focal plane, in which said light source is a luminous spot moving on a surface of a phosphor with short decay time and with broad emission spectrum. Moreover, the exactly defined wavelength of the resolved light beam, focused on the exit slit of the optical system, corresponds to each position of the luminous spot in the entrance slit of that system.

In an exemplary, most simple design of a spectrophotometer of the invention, a movable light source can be obtained by means of a known electron-ray tube, equipped with a device deflecting the electron beam. This enables obtaining a considerably greater speed of scanning of the spectrum, and so to perform the spectrophotometric analysis of the components appearing in a short-lived phenomena of, for example, a duration of about 0.1 millisecond. Besides, owing to the use of a monochromator free of its own inertia a possibility may be obtained of exact synchronization of the analysis with a simultaneously proceeding phenomenon which is to be examined. The speed of variation of the wavelength, and so the velocity of scanning the spectrum in the spectrophotometer of the invention can be freely controlled in a wide range by means of regulation of the displacement velocity of the luminous spot on the phosphor surface, and the wavelength range of the examined spectrum can be controlled by changing the amplitude of that motion.

The accuracy of the spectrophotometric analysis depends on the maintenance of the intensity of the radiation transmitted through the sample within the limits of an optimum for each wavelength. In order to fulfill this requirement, spectrophotometers have been constructed recently, wherein the device measuring intensity of the radiation of a given wavelength transmitted through the sample is feedback coupled with a device controlling the radiation intensity of the beam falling on the sample or with a device suitably changing the sensitivity of the detector. Most frequently, there is applied an electromechanical device of relatively great inertia, which causes high regulation time lags.

The above mentioned disadvantage is removed by means of the spectrophotometer of the invention, wherein a photoelectric detector measuring the intensity of radiation is connected in feedback relative to an electronic element, e.g. to the electron-gun of the electron-ray tube, controlling without inertia the luminance of the light source.

Moreover, the spectrophotometer of the invention enables an operation in a double beam system. The measurement is in such a case fulfilled simultaneously on two separated beams of monochromatic light, the one of which passes through the test sample and the second one through the reference sample without the necessity of any commutation or chopping of the beams.

Hitherto known spectrophotometers are equipped with indicating or recording devices of two different kinds. To the first kind there belong recording or printing devices of an electromechanical type, the main advantages of which are considerable inertia and long recording time. The second kind comprises electronic indicating devices, most usually oscilloscopic ones, in which an electron beam draws the spectral curve of the dependence of radiation intensity on the wavelength, on the screen, and renders possible its visual observation and its recording by means of photographic methods. The disadvantage of devices of this kind is their relatively low accuracy, caused by the limited size of the screen and by the low linearity of the amplifiers of oscilloscopic indicators, and also by the difficulties of placing on the screen markers of additional information.

The above mentioned disadvantages of known electronic spectrophotometers are removed in the spectrophotometer of the invention, as it is equipped with indicating-control device which is an electronic system which transforms the signal of the photoelectric detector of the test beam into corresponding phase delay of impulses displaying the spectral curve on the kinescope screen which enables a television screen type display in a rectangular coordinate system. Owing to that a high accuracy of the spectral curve may be achieved and, moreover, if a corresponding function generator applied, it is possible to display that curve on a chosen scale, e.g. in the logarithmic one, most suitable for the quantitative analysis, as the absorbance value, measured in that scale, is proportional to the concentration of the solution components. In the case of hitherto employed spectrophotometers, however, the display of the spectral curve on the oscilloscopic screen in logarithmic scale is rather difficult as employing of complicated and inaccurate logarithmic amplifiers is needed whereas, in the case of employing of accurate and less complicated logarithmic function generators and the using of a television screen type display, it is possible to get that function.

Moreover, the spectrophotometer of the invention is equipped with a photoelectric element, arranged in the entrance slit of the optical system of the monochromator and used to generate a signal which is transmitted onto the kinescope screen, which enables an exact assignment of the correct wavelengths to the given points of the spectral curve. Owing to that, it becomes possible to determine the wavelengths of defined points of the spectral curve with elimination of the influence of additional electric and optical factors.

For an exact numerical determination of transmittance or absorbance, corresponding to given points of the spectral curve on the picture tube screen, the indicating-control device is equipped with a system transmitting onto the screen a standard signal in a form of a direct voltage displayed on the screen as a line corresponding to the given value of the absorbance or transmittance. A decade device, e.g. a decade potential divider calibrated directly in the absorbance or transmittance values and indicating the set value in digital form, is used for setting the indicator, which method of internal standard eliminates many causes of error.

Details of this invention are next explained by reference to the drawings in which.

Figure 1:
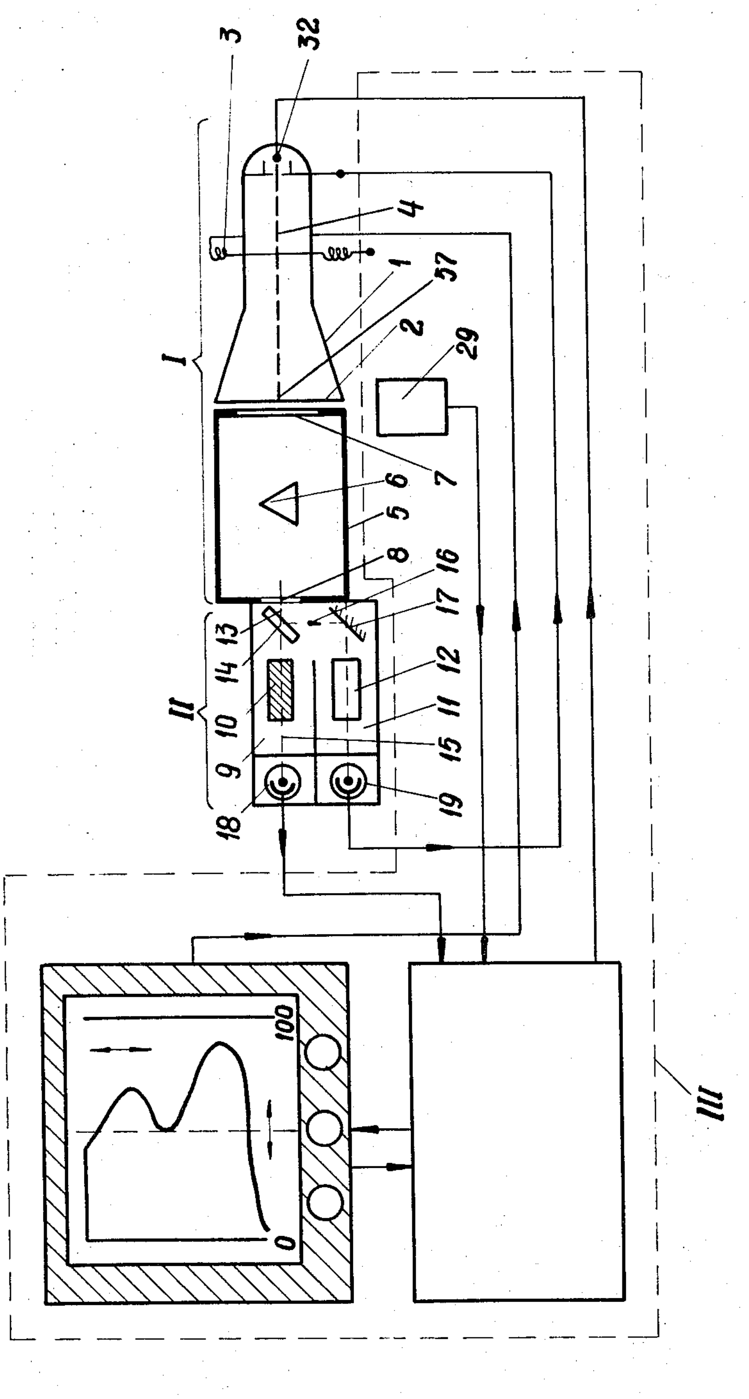
FIG. 1 shows a general diagram of the electronic spectrophotometer of the invention.
Figure 2:
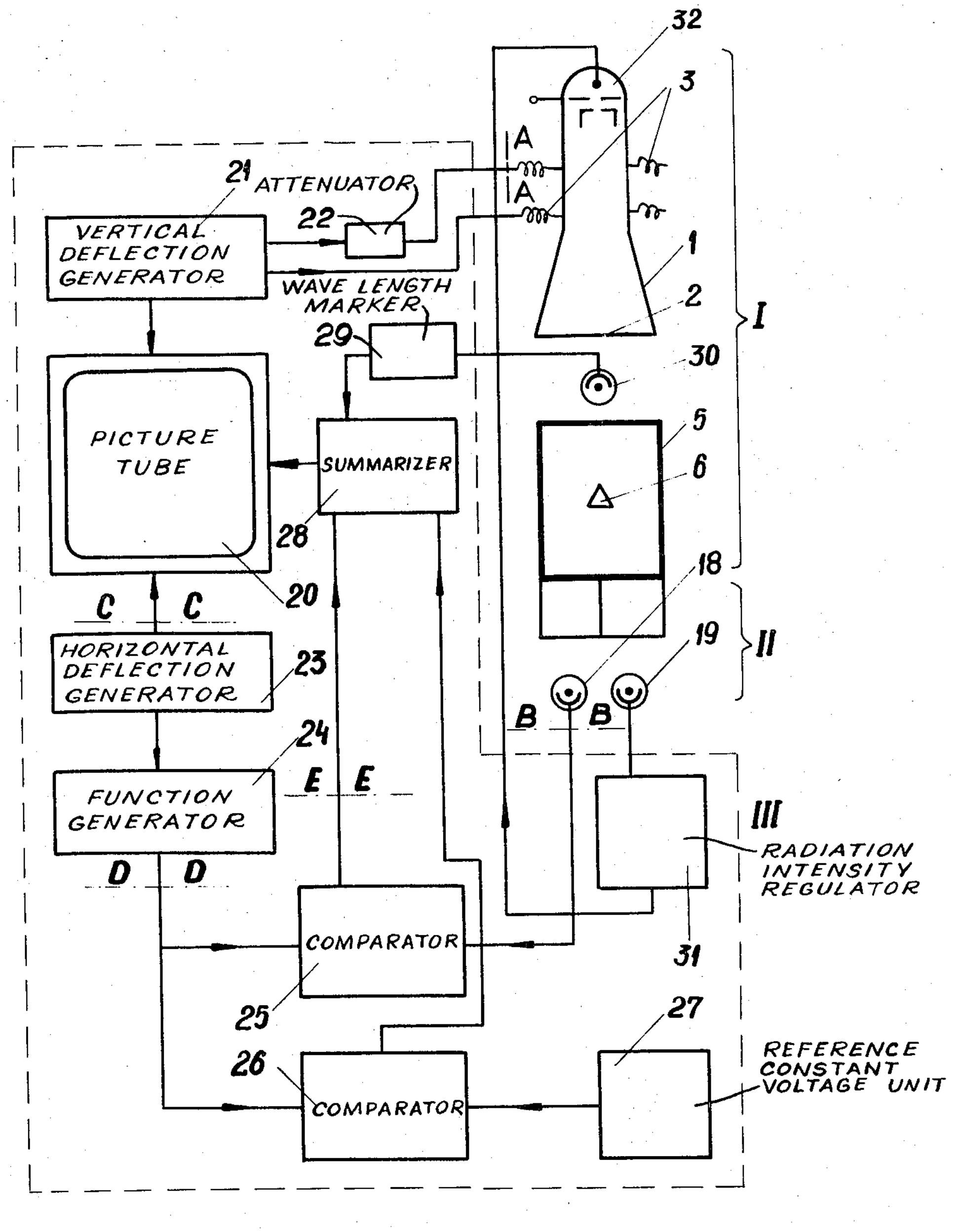
FIG. 2 shows an electric block diagram of above.

The electronic spectrophotometer of the invention is composed of the following basic units: monochromator I, measuring unit II and indicating-control device III.

The monochromator of the exemplary spectrophotometer design shown in the drawings is composed of the two following units: an electron-ray tube 1 and an optical system. The electron-ray tube 1 is equiped with a screen 2 made of phosphor having a short decay time and broad emission spectrum, and with external deflection units 3 deflecting the electron beam 4 emitted by the electron gun 32.

The optical system of the monochromator consists, in its most simple solution, of a chamber 5 in the inside of which a dispersion element is arranged, e.g. a prism 6 or a diffraction grating, and optical elements (not shown in FIG. 1) for condensing the beam. Chamber 5 is equipped with a wide entrance slit 7 (FIGS. 8 and 9), arranged in front of the luminescent screen 2 of the electron-ray tube 1, and with a narrow exit slit 8.

The measuring unit II consists of two chambers: chamber 9 in which the test sample 10 is located and chamber 11 in which the reference sample 12 is located, and of a radiation divider 14 splitting the monochromatic light beam 13 at the exit of the optical system into two beams 15 and 16 passing accordingly through the test sample 10 and reference sample 12, whereby the chamber 11 is equipped on its entrance in a reflecting element 17 which changes the direction of the beam 16. At the exit of the chambers 9 and 11 and there are fitted photoelectric detectors 18 and 19 having the same characteristics as one another.

Figure 8:
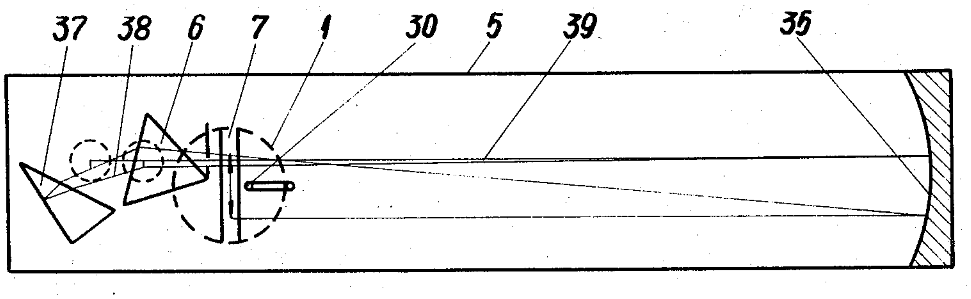
FIG. 8 shows an exemplary constructional solution of the monochromator in vertical section.
Figure 9:
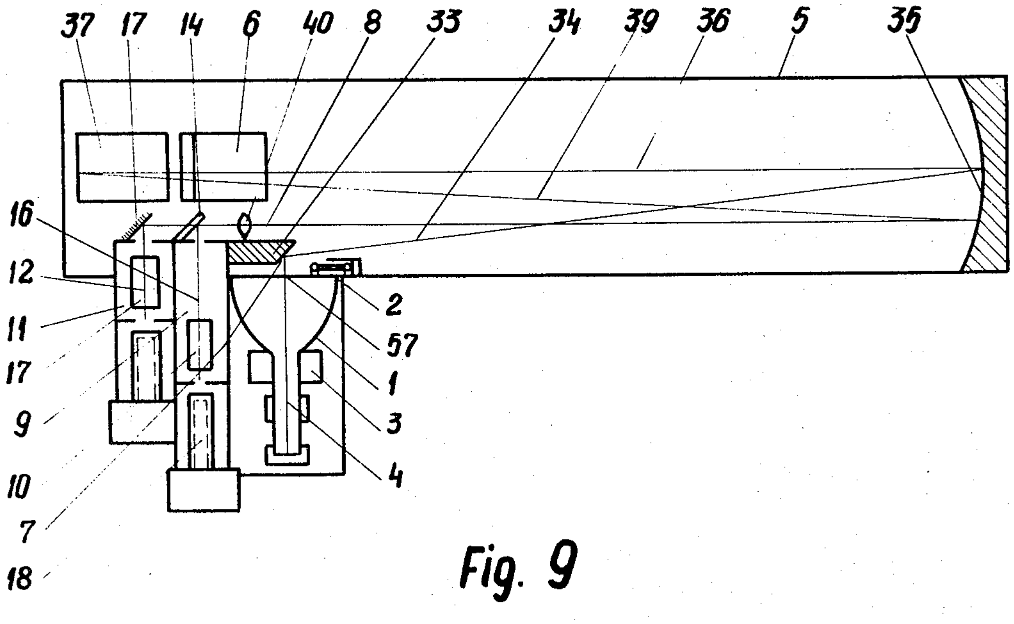
FIG. 9 is the same in horizontal section.

In FIGS. 8 and 9, there is shown a diagram of an exemplary constructional solution of a monochromator with an optical autocollimating system. This system is equipped with a reflecting element 33 fitted just in front of the entrance slit 7, a condensing element 35 having the form of a concave mirror which directs the reflected beam of parallel rays onto the prism 6 and then into the autocollimating prism 37, which causes an additional resolution and reflection of the partially resolved beam 38 and the repassing of it through the prism 6. The resolved beam 39 is directed anew onto the concave mirror 35 and after reflecting it is focused in the exit slit 8 and then through the lens 40 it is directed onto the radiation divider 14.

Owing to application of the autocollimating system the radiation beam is resolved twice, whereby owing to two-fold utilization of the focusing and reflecting mirror element 35 it is possible to reduce considerably the dimensions of the monochromator and to reduce light losses especially in the wavelengths range corresponding to the ultraviolet radiation.

The indicating-control unit of the spectrophotometer of the invention is composed of the following basic units: an indicator in the form of a picture tube 20 enabling a television screen-type display, a vertical deflection generator 21 which on the one hand is coupled to the vertical deflection element of the tube 20, and on the other hand, through a regulated attentuator 22, to the deflecting elements 3 of the electron-ray tube; and the deflection generator 23 coupled to the horizontal deflecting element of the tube 20, which generator is controlled by the function generator 24. The output of the function generator 24 is coupled to the comparator 25, itself connected to the photoelectric detector 18, and simultaneously to the comparator 26 connected to the reference direct voltage unit 27. Moreover the outputs of both comparators 25 and 26 are connected with a summation element 28 coupled to the electron gun grid of the picture tube 20. The indicating-control device is also equipped with a system 29 of a wavelength marker Z, controlled by a photoelectric element 30 arranged in the entrance slit 7 of the monochromator, the output of the marker system 29 being coupled to the summation element 28; and with the regulator unit 31 regulating the radiation intensity. The regulator unit is controlled by a photoelectric detector 19 fitted at the exit of the chamber 11, and its output is coupled to the electron gun element 32 of the electron ray tube 1.

Figure 10:
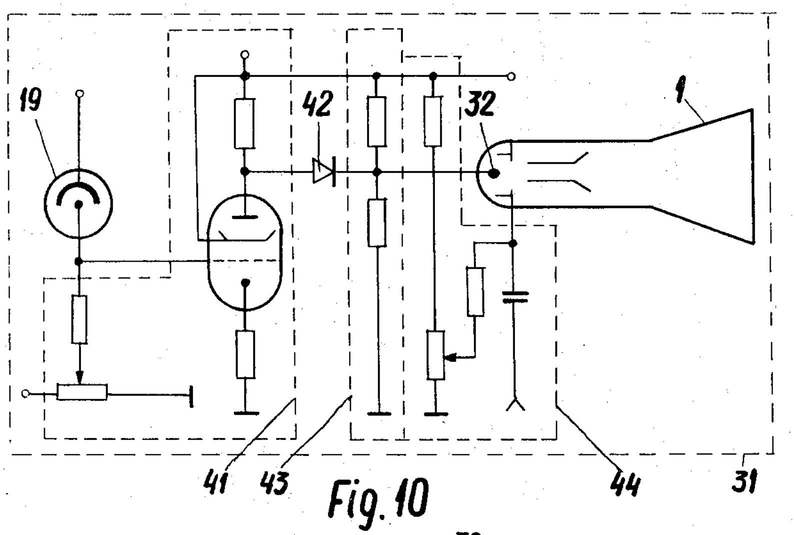
FIG. 10 shows an electric diagram of the system operating the feedback circuit.

The system 31 regulating the radiation intensity is separately shown in FIG. 10. It is composed of a single-stage amplifier 41, to the input of which a load resistance of the photoelectric detector 19 is coupled, which detector is located in the measuring chamber 11 the reference sample 12. The output of the amplifier 41 is coupled, by means of a diode 42, to the potential divider 43, determining the cut-off point of the forward current of that diode and is connected to an element, for example to the electron gun cathode 32 of the electron ray tube 1. To the grid circuit of the tube 1 is coupled a system 44, used for controlling the intensity of the electron beam.

Figure 11:
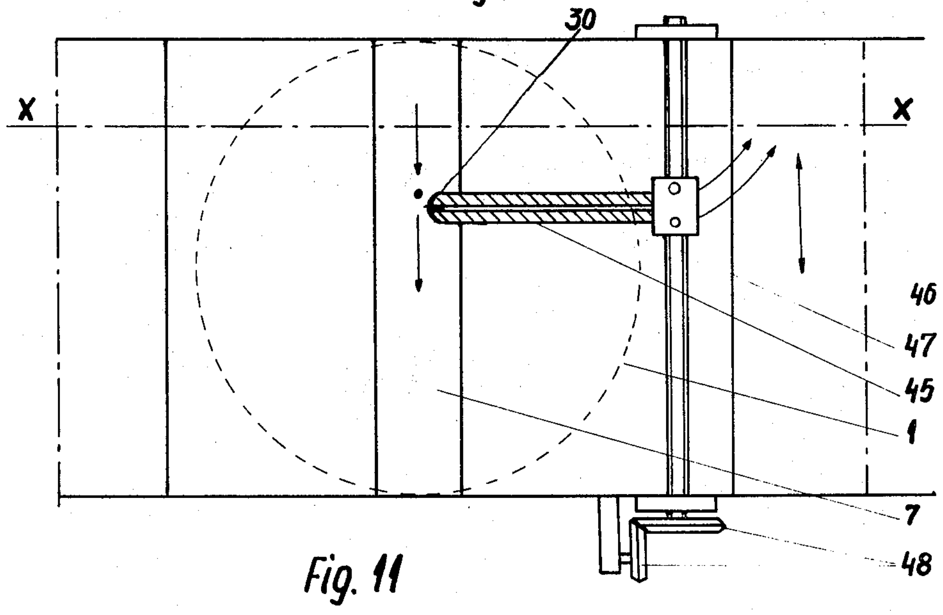
FIG. 11 shows a mechanism for displacing the photoelectric element in the entrance slit of the monochromator, in plan.
Figure 12:
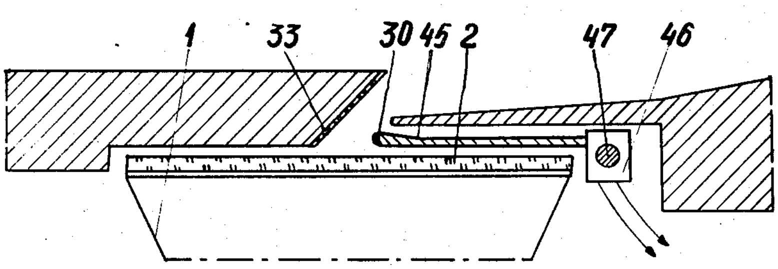
FIG. 12 is the same as above in the section along the line X—X in FIG. 11.

An example of constructional solution of a mechanical device used for displacing the photoelectric element 30 is separately shown in FIGS. 11 and 12. This device consists of a slider 46 moved by means of a screw 47 and a driving gear 48 and equipped with a guiding arm 45 to which is fitted the photoelectric element 30 travelling along the entrance slit 7. The outputs of the photoelectric element 30 are fed to the system 29 of the wavelength marker.

Figure 13:
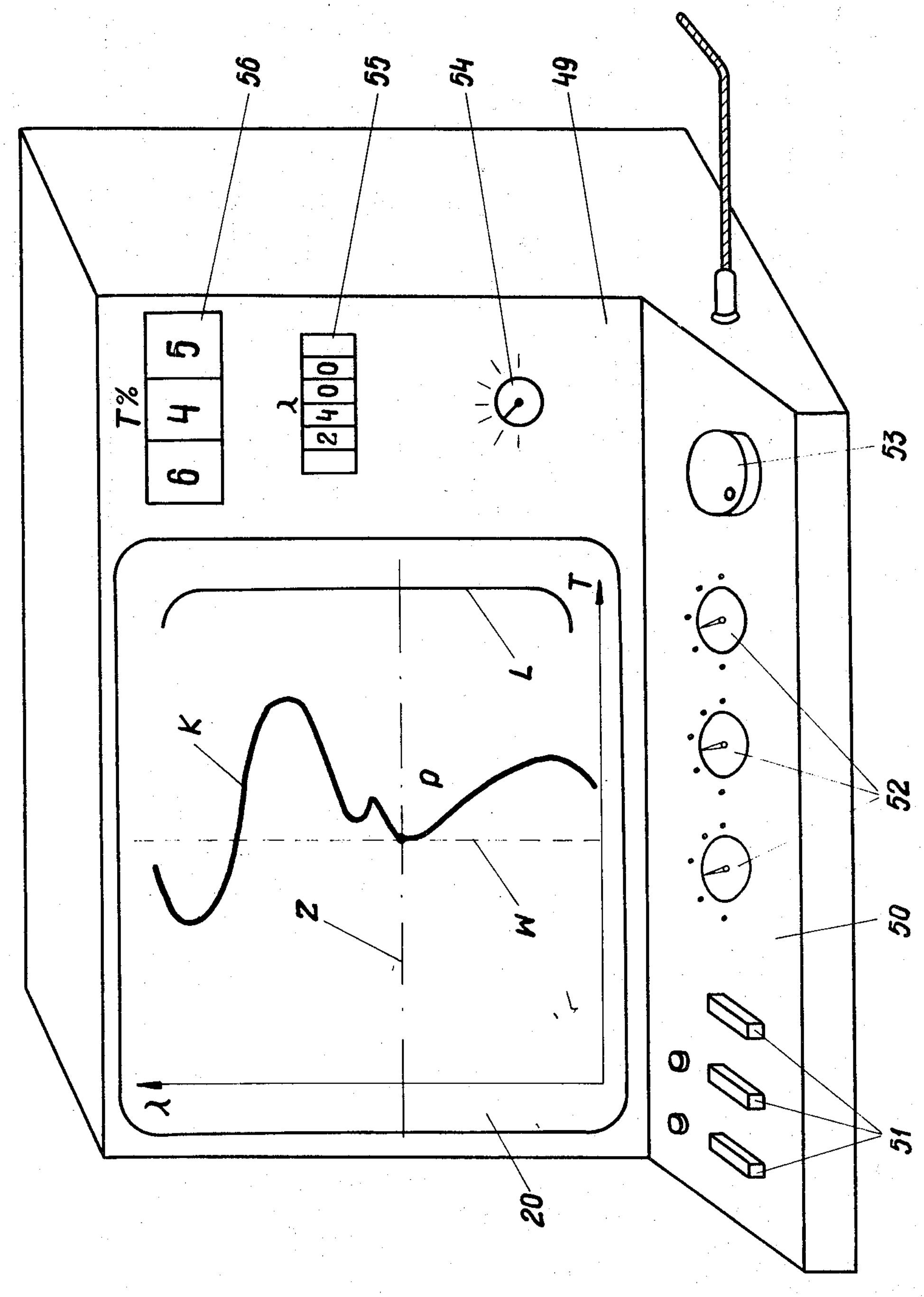
FIG. 13 shows an exemplary constructional solution of the indicating-control device in perspective view.

An exemplary constructional solution of the casing of the indicating-control unit is shown in FIG. 13. In the inside of that casing the picture tube 20 is arranged along with all the electronic units. On the control panel 50 there are the controls 51 of the initial operating conditions; knobs 52 for decade regulation of the reference voltage unit 27; and element 53 driving the slider 46 to which the photoelectric element 30 is attached; an element 54 for setting the attenuator 22 of the deflection unit; a digital wavelength indicator 55; and a digital indicator 56 of absorbance or transmittance values.

The operation of the spectrophotometer of the invention will next be explained below.

Figure 3:
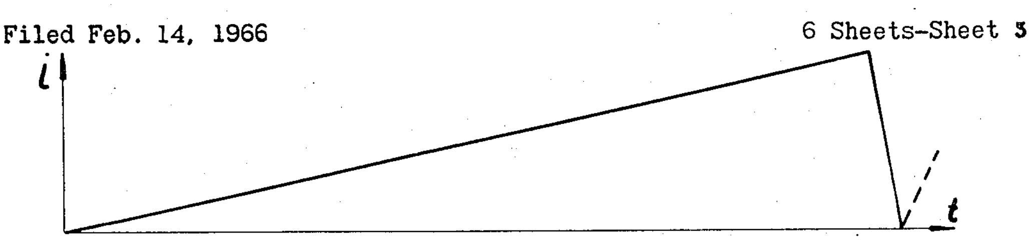
FIG. 3 is a deflecting current diagram at the point designated by the line A—A in FIG. 2.

The electron gun 32 of the electron ray tube 1 produces an electron beam 4 deflected in the magnetic or electric field produced by the deflecting element 3 and causes the displacing of the point radiation source 57 on the phosphor screen 2. Movement of the light point is controlled by means of the deflection current sweep (FIG. 3) produced in the vertical deflection generator 21 and transmitted on the deflecting element 3 of the tube 1 through the attenuator 22 used for regulation of the intensity of that current. The same sweep as shown in FIG. 3 is applied from the generator 21 to the vertical deflection element of the picture tube 20. The beam 34 of the radiation of the point source 57 travelling on the phosphor surface along the slot 7 is reflected from the mirror 33 and then condensed into beam 36 of parallel rays by the concave mirror 35. After the beam 36 passes through the prism 6 it is partially resolved, and after reflection and further resolution by the autocollimation prism 37 it passes again through the prism 6 and is resolved further. The spectrally resolved beam 39 is reflected by the concave mirror 35 and focused in the exit slit 8. During the periodic motion of the luminous point

57 along the slit 7, an exactly defined wavelength of the radiation passing through the exit slit 8 corresponds to each position of the luminous point in the slit 7, and to a complete displacement of the point 57 across the luminescent screen 2 there corresponds a full scale of the spectrum in the limits determined by the properties of the phosphor. That range can be also narrowed by the change of the amplitude of the movement of the luminous point 57, i.e. of the amplitude of deflecting current (FIG. 3) by means of the attenuator 22. After passing through the lens 40, the parallel beam 13 of the monochromatic radiation with continuously changing wavelength is split by means of the radiation divider 14, whereby the beam 15 passes through the test sample 10 onto the photoelectric detector 18, and the beam 16 after reflection from the mirror 17 passes through the reference sample 12 onto the detector 19.

The output signal of the photoelectric detector 18 is proportional to the radiation intensity of a corresponding wavelength transmitted through the test sample 10 and is fed the input of the comparator 25.

Figures 4, 5, 6:
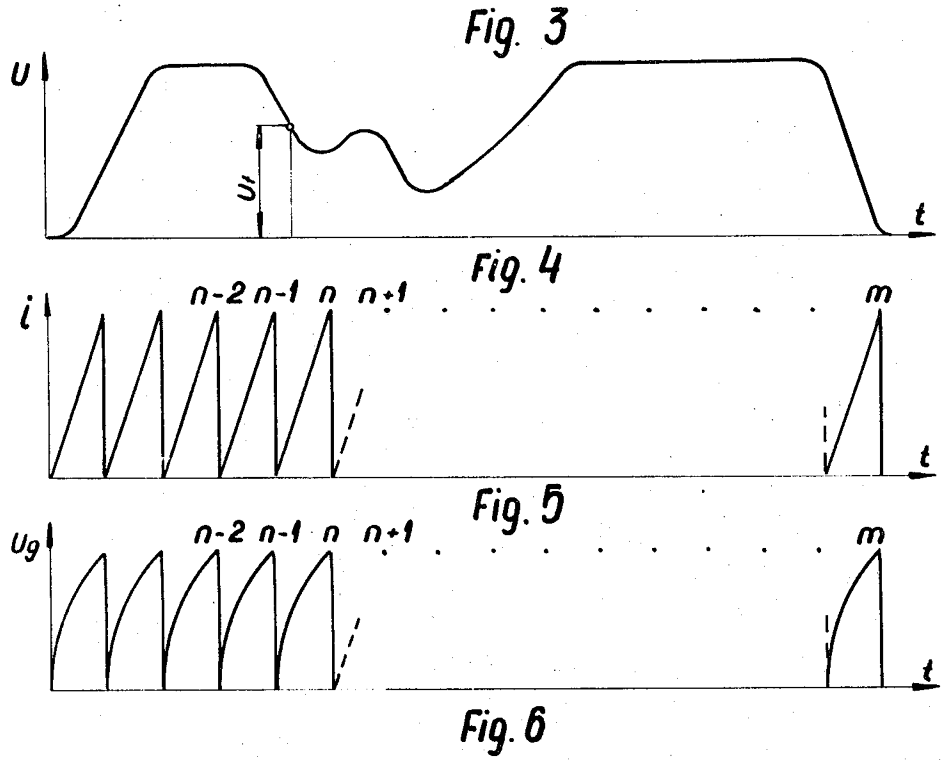
FIG. 4 is an exemplary detector voltage diagram at the point designated by the line B—B in FIG. 2.
FIG. 5 is a deflection current diagram of the line generator at the point designated by the line C—C in FIG. 2.
FIG. 6 is a voltage diagram on the output of the logarithmic function generator at the point designated by the line D—D in FIG. 2.

The operation of the comparator 25 such as to perform a comparison of the signal $U_t$ from the detector 18 the plot of which is illustratively shown in FIG. 4, with that emitted periodically from the function generator 24. In FIG. 6 there is in an exemplary manner shown the plot of signals emitted from the generator 24, this being a known logarithmic function generator, in a period corresponding to the full amplitude of the movement of the luminous point 57. As the value $U_t$ of the voltage applied to the comparator 25 from the detector 18 becomes equal to that emitted from the function generator 24, an impulse is transmitted from the comparator 25 through the summation element 28 (FIG. 7) on the electron gun grid of the picture tube 20, causing in the moment of its emission the appearance of a light spot on the kinescope screen. The time $t_1$, corresponding to the moment of formation of that impulse, in the case of logarithmic function generator, is proportional to the logarithm of the value of the compared voltage $U_t$, and, therefore to the logarithm of the intensity of radiation falling on the photoelectric detector 18. As the function generator 24 is coupled to and triggered by the horizontal deflection generator 23—at the time $t_1$ the position of the light spot on the picture tube screen 20 is exactly determined on the horizontal coordinate of this screen. Simultaneously occurs a vertical movement of the light spot on the picture tube screen 20, controlled by the deflection current shown in FIG. 3, so that a vertical coordinate of the position of the light spot on the screen 20 corresponds to an exactly defined position of the light source 57 in the entrance slit of the monochromator, that is to a determined wavelength.

Figure 7:
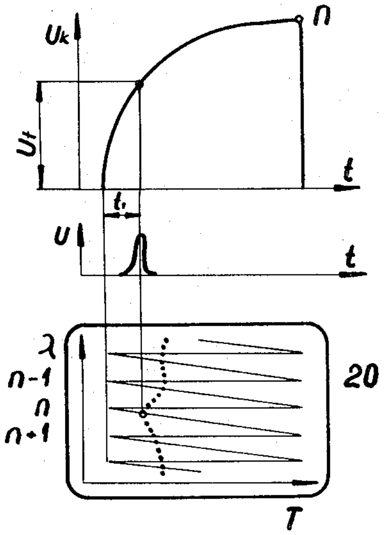
FIG. 7 shows a diagram explaining the operation of the comparator and conforming with the point designated by the line E—E in FIG. 2, and an effect corresponding to it appearing on the picture tube screen.

In that manner the position of the light spot on the screen of the tube 20 traces (FIG. 7) on the vertical coordinate the wavelength of the radiation, and on the horizontal coordinate the transmittance value, i.e. the radiation intensity passing through the test sample 10 (value T in FIGS. 7 and 13). To a full amplitude of the motion of the light point 57, and so to one full scan of the spectrum there correspond several (for instance about 1000) horizontal passes. On the picture tube screen 20 is obtained a set of points, the positions of which along the axis $\lambda$ correspond to the values of the wavelength of the radiation transmitted through the sample 10, and the position along the axis T is a measure of the intensity of radiation transmitted through that sample. That set of points forms on the screen a spectrophotometric curve K corresponding to the composition of the specimen at the given moment of the spectral analysis.

In order to determine accurately the transmittance value of selected points of the spectrophotometric curve, for example, at an arbitrary point P in FIG. 13, the position of the marker W (FIG. 13) should be set by means of setting elements 52 of the decade system 27 for the reference direct voltage, so that the marker would pass through the point P. Then the value of set voltage applied to the comparator 26 and compared in the above-described manner with the voltage applied to the comparator from the function generator 24 causes, that in the moment of equalization of both voltages, the comparator forms impulses transmitted through the summation element 28 onto the grid of the picture tube 20 and causes the shadowing of corresponding points of the screen forming the line W.

The value of set voltage, exactly determined by the calibrated setting elements 52, in the case of overlap of the point P with the line W, is equal to the voltage transmitted from the photoelectric detector 18 onto the comparator 25 and it is simultaneously shown on the digital indicator 56 scaled directly in transmittance units.

In order to determine exactly the wavelength corresponding to any chosen point of the spectrophotometric curve K, for instance to the point P in FIG. 13, the driving mechanism shown in FIGS. 11 and 12 should be operated to move the photoelectric element 30 along the entrance slit 7 of the monochro-motor device. At the moment the photoelectric element 30 in its defined position is passed by the movable luminous spot 57 on the luminescent screen 2 of the electron ray tube 1, that element forms a signal of a system 29 of the wavelength marker 2 which system shapes the impulse. The duration time of the impulse shaped by the system 29 should be equal to the period of horizontal deflection. Owing to that, impulses transmitted through the summation element 28 onto the electron gun grid of the picture tube 20 causes to be formed on the screen of this tube a dark-marker line Z, the position of which exactly corresponds to the position of the photoelectric element 30 in the slit 7 and likewise to a defined wavelength $\lambda$. At the same time the position of the photoelectric element 32 in the slit 7 is mechanically or electrically transmitted to the indicator 55, showing the wavelength value $\lambda$ corresponding to the set position of the marker line Z on the tube screen 20.

The second beam 16 of the monochromatic radiation, which passes through the reference sample 12 of standard transmittance in relation to which the transmission of radiation of the investigated sample 10 is measured, falls onto the photoelectric detector 19 having the same characteristics as the detector 18. Thus, the value of the voltage received from the load resistor included in the circuit of the photoelectric detector 19 (FIG. 10) is proportional to the intensity of the radiation emitted by the movable light source 57 and to the sensitivity of detectors 18 and 19 for the radiation of a given wavelength. In order to get a constant voltage on the output of the detector 19 for different wavelengths, voltage is applied to the amplifier tube grid 41, which amplifies and reverses its phase, and then it is applied to the diode 42 of constant bias voltage determined with the potential divider 43. In case the intensity of the radiation of the point light source 57 gets too high, the output voltage of the amplifier 41 becomes higher than the bias voltage of the diode 42, causing it to conduct to increase the cathode voltage of the electron gun 32 of the electron ray tube 1, and in this way to reduce the intensity of the electron beam 4 and of the luminance of the light source 57 to such level that the voltage on the output of amplifier 41 becomes equal to the bias voltage of the diode 42. At the same time, the output signal value of detector 19 will attain for all the radiation a desired constant value. Owing to that, if the test sample 10 and the reference sample 12 do not differ, a straight vertical line L is obtained on the screen of the picture tube 20, which line corresponds to the transmittance value of 100 percent.

The electronic spectrophotometer of the invention may be employed to provide fast and continuous spectrum measurements, and especially to test and control the technological processes of chemical industries and with a suitable attachment it may be also employed to determine the measurements of reflectance spectra surfaces.

What we claim is:

1. An electronic spectrophotometer comprising a monochromator having an entrance and exit and having at said entrance a focal plane and at said exit an exit slit, a cathode-ray tube having an electron gun and a phosphor screen, a movable light source in front of said phosphor screen, a beam splitter which splits a radiation beam at an exit of said monochromator into a test beam and a reference beam, a photoelectric detector for said reference beam, a negative feedback circuit coupling said photoelectric detector and said electron gun of said cathode-ray tube, said feedback circuit regulating the luminance of said light source so that said photoelectric detector of said reference beam has an output signal at a constant level independent of the wavelength of the radiation impinging on said detector, and a further photoelectric detector positioned to receive said test beam transmitted through a sample and having an output signal directly proportional to the transmittance of said sample.

2. A spectrophotometer as claimed in claim 1, comprising a luminance regulator for said light source including an amplifier with a control element coupled to the output of said photoelectric detector of said reference beam, a diode coupling said amplifier to the electron gun of said cathode-ray tube, and a potential divider biasing said diode.

3. A spectrophotometer as claimed in claim 1, including a picture-tube indicator and a vertical deflection generator coupled in parallel to said picture-tube indicator and controlling its deflection along an axis indicating wavelength of radiation and to said cathode-ray tube and controlling the position of said movable light source, which position determines the wavelength of radiation at the exit of said monochromator, and a television-type display of absorption spectra and of auxiliary markers on said picture-tube indicator, including a function generator, a horizontal deflection generator feeding said function generator and said picture-tube indicator in parallel and controlling deflection of said indicator along an axis indicating transmittance, a comparator having an input connected to the output of said detector of the test beam and to said function generator, and an output coupled to an electron gun of said picture-tube indicator, so that at every instant when both signals at the input of said comparator become equal the comparator forms a short pulse which is transmitted on said electron gun of said picture-tube indicator, and causes a distinguishing spot to appear on a screen of said picture-tube indicator, a plurality of said spots forming a display of a measured absorption spectrum curve.

4. A spectrophotometer as claimed in claim 3, comprising a source of a reference direct voltage, and a divider of said voltage, and a second comparator having an output coupled to said electron gun of said picture-tube indicator and an input coupled to and receiving signals from said function generator and said voltage divider, so that at every instant when both said signals become equal said comparator forms a short pulse which is transmitted on said electron gun of said picture-tube indicator and causes a distinguishing spot to appear on a screen of said picture-tube indicator, a plurality of said spots forming a display of a straight line of an electronic marker controlled by the reference voltage divider, said adjustable divider being also coupled to a digital indicator of transmittance.

5. A spectrophotometer as claimed in claim 4, wherein said function generator is a logarithmic function generator, and said reference voltage divider is scaled in a logarithmic scale indicating a digital value of absorbance corresponding to said electronic marker appearing on a screen of said picture-tube indicator.

6. A spectrophotometer as claimed in claim 3, wherein said monochromator is provided with an entrance slit through which light from said movable light source passes, photoelectric means displaceable along said slit, a wavelength marker means coupled to said photoelectric means and to said electron gun of said picture-tube indicator, so that said wavelength marker means at an instant of illumination of said photoelectric means by said light source forms a short pulse which is transmitted to said electron gun of said picture-tube indicator and causes a distinguishing spot to appear on a screen of said picture-tube indicator, a plurality of said spots forming a display of a straight line of an electronic wavelength marker controlled by the position of said photoelectric means in said slit, and a digital wavelength indicator, coupled mechanically to and indicating in wavelength units the adjustable position of said photoelectric means in said slit.

7. A spectrophotometer as claimed in claim 3, comprising an attenuator coupling said vertical deflection generator to said cathode-ray tube, said attenuator controlling amplitude of deflection of said movable light source and thus controlling the range of spectrum scanned.

References Cited

UNITED STATES PATENTS

| | | | |
|---|---|---|---|
| 2,824,972 | 2/1958 | Beitz | 356—83 |
| 3,039,353 | 6/1962 | Coates et al. | 356—89 |
| 2,437,323 | 3/1948 | Heigl et al. | 88—14SA |
| 3,048,080 | 8/1962 | White | 88—14S |
| 3,205,763 | 9/1965 | Bradley | 88—14SE |

OTHER REFERENCES

"Cathode Ray Tube Displays," Soller et al., McGraw-Hill Book Company, Inc., 1948, pp. 248–250.

RONALD L. WIBERT, Primary Examiner

V. P. McGRAW, Assistant Examiner

U.S. Cl. X.R.

250—226; 356—88, 96